UNITED STATES PATENT OFFICE.

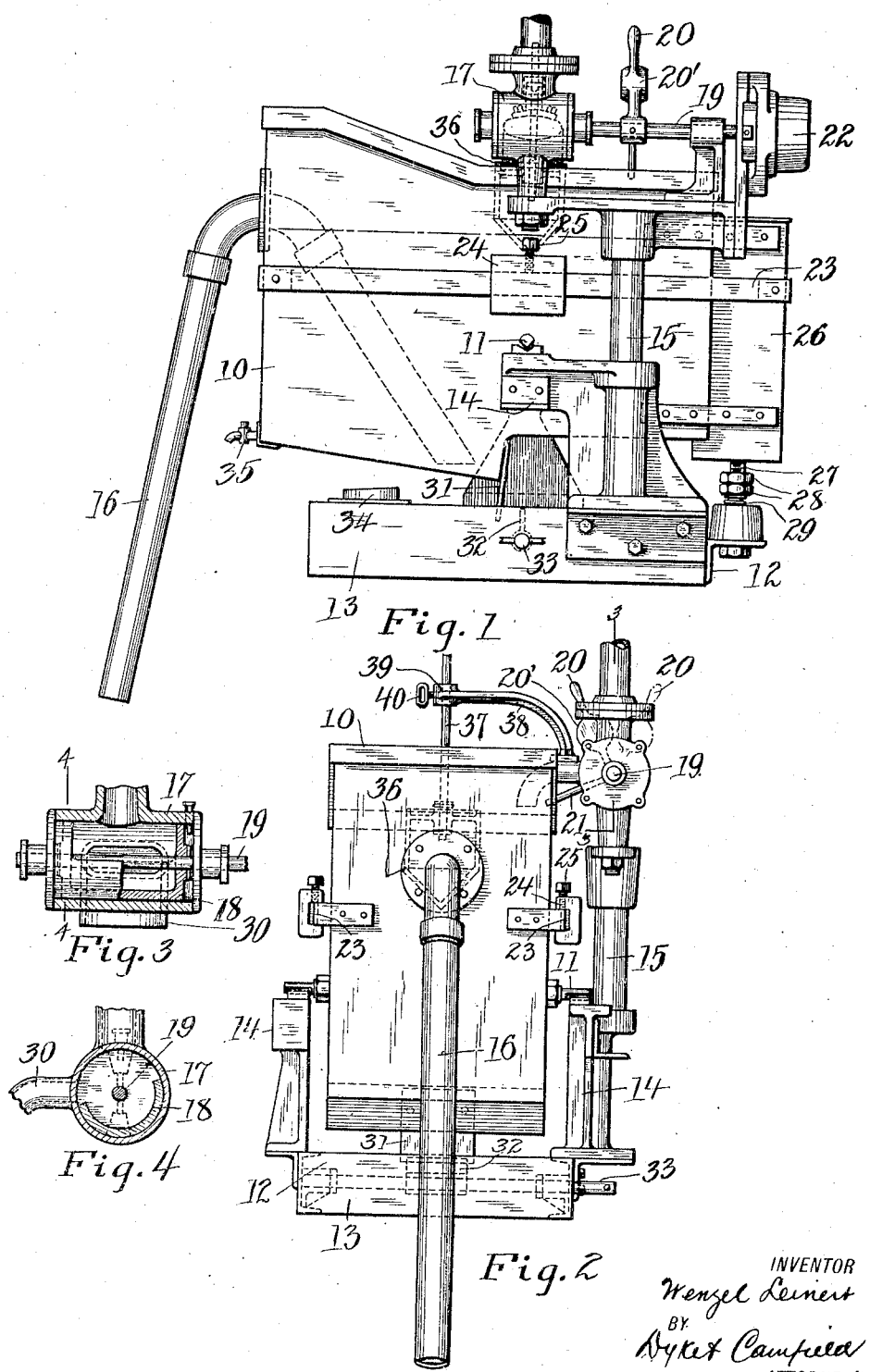

WENZEL LEINERT, OF NEW YORK, N. Y.

LIQUID-WEIGHING APPARATUS.

1,319,478.  Specification of Letters Patent.  Patented Oct. 21, 1919.

Application filed January 9, 1918. Serial No. 210,975.

*To all whom it may concern:*

Be it known that I, WENZEL LEINERT, a citizen of Russia, and a resident of New York, county of New York, and State of New York, have invented certain new and useful Improvements in Liquid-Weighing Apparatus, of which the following is a specification.

My invention relates to apparatus for delivering predetermined quantities of liquids.

The object of the invention is the provision of simple means for supplying predetermined quantities of liquids, adapted to be manually set in operation and to be automatically shut off upon a single delivery of the quantity of liquid for which the apparatus is set.

Another object of the invention is the provision of an improved form of construction for weighting and balancing so as to adapt the device for use with liquids of a considerable range of specific gravity and at the same time provide an apparatus which is simple and compact, being readily operated and taking up little space.

Other objects of the invention will appear in connection with the further description, and with the foregoing and related objects in view my invention consists in the constructions, parts, improvements and combinations herein set forth and claimed.

In the drawing I have shown an embodiment of my invention for the purpose of making the invention clearly understood, and in the said drawing forming part of this specification and wherein the same reference numerals are uniformly used to designate the same parts throughout, Figure 1 is a side view of a device embodying my invention. Fig. 2 is an end view thereof; and Figs. 3 and 4 are sectional detail views of the valve apparatus.

Reference numeral 10 designates the measuring tank which is supported on knife edges 11 on a frame 12. Such frame may be of any suitable construction, but as shown it comprises a base plate 13 and supporting brackets 14 mounted thereon and carrying the knife edge bearings. In the form shown one of the brackets 14 has a post 15 connected therewith which serves to support the valve apparatus. The valve apparatus is so constructed that the liquid is automatically shut off by the tipping of the measuring tank 10 and remains shut off until the valve is again manually opened. With such arrangement when the quantity of liquid for which the apparatus is set is desired to be delivered, through the delivery spout 16, all that is necessary to be done is to manually operate the valve to open the same, whereupon when the measuring tank has been filled to the desired extent it automatically dumps, and when the liquid has been discharged, returns to its normal position, but the valve remains closed. In the form shown the valve comprises a casing 17 and a movable valve member 18, here shown as having the form of substantially a semi-cylindrical shell secured to and turning with a shaft 19 which extends out through the casing 17, suitable packing means being provided to prevent leakage, and is provided with a manually operable handle 20 and with a projecting arm 21 adapted to be operated by the tilting of the tank. Means for releasably holding the valve in whatever position it way be placed are provided, and in the form shown the handle 20 is provided with a counterweight 20' which passes the vertical in the movement of the handle 20 and serves, by the action of gravity, to releasably hold the valve either in open or closed position. The arm 21 projects laterally over the tank 10 so as to be actuated thereby when the tank is tipped to discharge its contents. Being located behind the pivoting center, it is moved upward to close the valve when the tank tips forwardly. The shift 19 may be connected with a suitable registering or counting device 22, if desired.

Bars 23 are secured to the tank and extend preferably parallel to the sides thereof and provide runways for balancing weights 24 which may be secured in adjusted positions as by means of set screws 25. At a suitable location on the tank 10, and preferably at the end opposite the discharge end, I secure a holder or receptacle 26 adapted for receiving weights as may be needed, for example, if very heavy liquids are to be measured, and adjustability in respect of weights is desired beyond that provided by the movable counter-weights 24.

Means, such as a screw 27 with lock nuts 28, may be provided for adjusting the tank level, and if desired the same may contact with the bottom of the receptacle 26, and a spring 29 may be used in connection therewith to ease the shock as the tank returns to initial position after emptying, or various other forms of shock reducing means may be resorted to if desired, for example, the tank may have a downwardly projecting member 31 thereon which may contact in its movement either way with an upwardly extending arm 32 on a shaft 33 having spring means such as shown in my Patent No. 1,247,693, granted Nov. 27, 1917, connected thereto and serving to normally maintain the arm 32 in the vertical position, but permitting it to yield either way as the member 31 comes in contact therewith on alternate sides. Such damping devices, however, form no part of the present invention and are not claimed herein. A suitable stop member, as shown at 34, is preferably provided to limit the downwardly tipping movement of the forward or discharge end of the tank, and a pet-cock 35 may be provided for draining the tank when desired.

Means are also preferably provided for varying the fluid capacity of the tank without interfering with the discharge of liquid therefrom when the tank is tipped. Such means may comprise a preferably hollow shell 36 extending downwardly into the tank 10 from above and may be carried on a rod 37 which is preferably adjustably supported in a bracket 38 secured to any convenient support, as in the form shown it is secured to the nozzle 30. In the form shown, the rod 37 passes through an opening 39 in the bracket 38 and is adjusted by a set screw 40. The shell 36 displaces its volume of fluid and is designed for adapting the apparatus for use with relatively heavy liquids and for the measuring of reduced quantities of liquid without interfering with efficiency of operation, and serves to greatly increase the range of usefulness of the apparatus at slight expense. The displacement member, here shown as a hollow shell, is preferably cylindrical with a substantially conical or pointed lower end, and it is preferably located vertically in line with the knife edges 11. As its adjustment is up and down in substantially vertical alinement with the pivots, it may be adjusted without interfering with the balance. When not needed, the shell 36 or other liquid displacement member may readily be removed.

It will be seen that apparatus embodying the present invention presents a number of features of advantage. In numerous operations in plants where liquid material, such as chemicals, is used, a given quantity of a particular liquid material is desired to be supplied from time to time, as in making up a batch for operations, but the operations calling for such supply of liquid material may be carried out under a variety of conditions. For example, on one day the quantity to be delivered may be wanted for use once or twice, and on another day it may be needed every few minutes, whereas on a third day it may not be needed at all. This situation, which is frequently met, is fully taken care of by the present invention, as it is only necessary, when a desired quantity of the liquid is needed, to move the valve 20 from the position shown in dotted lines in Fig. 1 to that shown in full lines, in which position the valve is maintained by the weight 20'. The moving of the handle 20 in the manner described opens the valve and the liquid is discharged from the supply pipe through the nozzle 30 into the tank 10 until the latter has been filled to the desired level for which the liquid displacing member 36 (if used), the sliding weights 24 and any additional weights in the holder 26 have been adjusted, whereupon the tank 10 tips on its knife edges and the valve is closed by means of the arm 21 secured to the shaft 19 being moved upwardly by the tank during its tilting action. The fluid within the tank is discharged through the siphon spout 16, the bend whereof is brought below the liquid level upon the tipping of the tank, and when it has been delivered, the tank returns to its initial position as shown in Fig. 1 and is ready for further use immediately or at a future time, and when additional measured quantities of the liquid are desired to be obtained, it is only necessary for the operative in charge of the apparatus to again move the handle 20, whereupon the desired quantity is discharged and the flow automatically shut off without need for further attention. It will be understood that when the tank tips back before being emptied, the discharge of its contents through the siphon discharge tube 16 continues until substantially all the contents are discharged.

I claim:

1. In a device for delivering measured quantities of liquid, a pivoted tank adapted to be turned on its pivots by liquid delivered thereinto, slideways on each side of the tank, adjustable weight members on said slideways, a receptacle for additional weights secured to said tank, a valve for delivering liquid into said tank, an upwardly extending weighted handle for manually operating said valve, the weight being adapted to releasably maintain the valve in closed or open position, and an arm pivoted to said valve and extending into the path of the tank when tilted and adapted to be operated to close said valve on the tilting of the tank.

2. In apparatus for delivering measured quantities of liquid, a pivoted tank adapted to be tilted on its pivots by liquid supplied thereto, a siphon discharge pipe for such tank, a hollow shell projecting downwardly into said tank from above, a stationary bracket on which said shell is adjustably mounted, said shell being located substantially vertically above the tank pivots, and adjustable counter-weight means on the exterior of said tank.

3. A device for supplying measured quantities of liquid, comprising a tank mounted so as to be capable of being tilted by its contents and having means for discharging its contents when tilted, a pipe having an outlet delivering into the tank, a valve in the pipe, means for manually operating the valve to open it, and additional means on the valve for operating the valve, said last mentioned means being disposed so that it is in the path of the tilting movement of the tank when the hand means has been moved to open the valve.

In testimony that I claim the foregoing, I have hereto set my hand, this 2nd day of January, 1918.

WENZEL LEINERT.

Copies of this patent may be obtained for five cents each, by addressing the "Commissioner of Patents, Washington, D. C."